United States Patent
Gianola

(10) Patent No.: US 7,454,838 B2
(45) Date of Patent: Nov. 25, 2008

(54) SCISSORS WITH IMPROVED RIVETED CLOSING SYSTEM

(75) Inventor: Dionigi Gianola, Premana (IT)

(73) Assignee: Consorzio Premax, Premana (LC) (IT)

( * ) Notice: Subject to any disclaimer, the term of this patent is extended or adjusted under 35 U.S.C. 154(b) by 234 days.

(21) Appl. No.: 11/447,964

(22) Filed: Jun. 7, 2006

(65) Prior Publication Data

US 2007/0169356 A1    Jul. 26, 2007

(30) Foreign Application Priority Data

Jan. 23, 2006   (IT)   ................ MI2006A0100

(51) Int. Cl.
   *B26B 13/28*   (2006.01)
(52) U.S. Cl. .................... 30/266; 30/254; 411/501
(58) Field of Classification Search .......... 30/254, 30/266, 267, 269, 270, 341, 344; 411/501, 411/531

See application file for complete search history.

(56) References Cited

U.S. PATENT DOCUMENTS

| | | | | |
|---|---|---|---|---|
| 741,576 | A | * | 10/1903 | Davies .......................... 30/268 |
| 1,755,141 | A | * | 4/1930 | Woythal ....................... 30/268 |
| 2,284,664 | A | * | 6/1942 | Kissling ....................... 30/230 |
| 2,594,941 | A | | 4/1952 | Lincoln |
| 2,626,460 | A | * | 1/1953 | Wahl ............................ 30/266 |
| 3,316,793 | A | * | 5/1967 | Mitchell ..................... 411/362 |
| 3,374,694 | A | * | 3/1968 | Eizenberg .................. 76/106.5 |
| 4,473,947 | A | | 10/1984 | Ishida et al. |
| 4,478,532 | A | * | 10/1984 | Puro .......................... 403/157 |
| 5,220,856 | A | * | 6/1993 | Eggert et al. .................. 81/416 |
| 6,131,291 | A | | 10/2000 | Mock et al. |
| 6,367,155 | B2 | | 4/2002 | Homann |
| 2005/0081362 | A1 | * | 4/2005 | Leistner et al. ............ 29/524.1 |

FOREIGN PATENT DOCUMENTS

| | | |
|---|---|---|
| EP | 0 195 868 | 10/1986 |
| GB | 2170137 | 7/1986 |

* cited by examiner

*Primary Examiner*—Hwei-Siu C Payer
(74) *Attorney, Agent, or Firm*—Young & Thompson

(57) ABSTRACT

Scissors (1) having a first lever (2) and a second lever (2') provided with respective coaxial holes (25, 25') in their central portions (20, 20') and a rivet (4) disposed in the holes (25, 25') of the levers (2, 2'). The scissors further include a bush (3) interposed between the rivet (4) and the surface of the hole (25) of the first lever (2) so that the first lever (2) can rotate with respect to the bush (3) which is maintained integral with the rivet (4), and a washer (5) interposed between the rivet (4) and the surface of the hole (25') of the second lever (2'), so that the outward deformation of a portion (42) of the rivet (4) compresses the washer (5) on the central part (20') of the second lever, making the second lever (2') integral with the rivet (4).

17 Claims, 3 Drawing Sheets

SCISSORS WITH IMPROVED RIVETED CLOSING SYSTEM

The present invention refers to scissors commonly used for cutting various types of materials and objects in general.

As is known, scissors comprise two levers pivoted to each other in an intermediate position. In this manner each lever defines a power arm and a resistance arm. The two power arms are shaped in the form of opposed grips to be gripped by the same hand of the user and the two resistance arms are shaped in the form of opposed blades to make the cut.

The two levers of the scissors are pivoted to each other by means of a screw. The first lever has a threaded hole in an intermediate position and the second lever has a through hole. The threaded shank of the screw passes through the through hole of the second lever and engages in a screwing relationship in the threaded hole of the first lever. As a result the second lever can rotate around the shank of the screw which remains integral with the first lever.

This traditional type of scissor presents various drawbacks due to the screw closure system of the two levers.

In fact tightening of the screw cannot be controlled and does not ensure an adequate homogeneity of closure of the two levers. Consequently the user, during cutting, is unable to obtain a perfect synchronism of operation of the two levers, with the result of greater difficulty in cutting.

Furthermore, with prolonged use of the scissors a gradual loosening of the screw is caused, which loosens the closure of the two levers. Consequently, the user during cutting must force the grips of the scissors more, with the result both of a greater difficulty in cutting and of a further stripping of the thread of the screw and of the threaded hole of the scissor lever.

Furthermore it must be considered that rust formation occurs along the thread of the screw and of the threaded hole of the lever, leading to rapid wear on the screw and on the scissors themselves, with the result of a short average life.

Scissors are known to the art, which have a system of closure of the two levers by means of a rivet, which is applied inside respective holes provided in the central part of the levers. However, such scissors too present some drawbacks, due above all to generation of excessive slack between the rivet and the surface of the holes of the levers, which result in an imprecise or inefficient cut.

Another drawback of scissors with rivet closure is represented by excessive friction between the rivet and the surface of the holes of the levers.

The object of the present invention is to overcome the drawbacks of the prior art, by providing scissors that are efficient, effective, long-lasting, cheap and simple to make.

The scissors according to the invention comprise a first lever and a second lever provided with respective coaxial holes in the central positions thereof and with a rivet disposed inside said holes of the levers.

A bush is interposed between the rivet and the surface of the hole of the first lever, so that the first lever can rotate with respect to the bush, which remains integral with the rivet.

A washer is interposed between the rivet and the surface of the hole of the second lever, so that the outward deformation of a portion of the rivet compresses the washer on the central part of the second lever, making the second lever integral with the rivet.

Such scissors according to the invention present various advantages with respect to scissors of the prior art.

Provision of the bush and of the rivet makes it possible to eliminate the pivoting screw with all the disadvantages associated therewith.

The outside diameter of the bush is greater than the diameter of the pivoting screw, with the result of a greater contact and sliding surface during rotation of the levers.

The riveting pressure of the rivet can be set in the riveting machine to obtain a constant and precise closure of the blades of the scissors during rotation of the levers.

It must also be considered that the rivet has a central through hole. Said hole, besides making the scissors lighter, can be engaged by a supporting pin. In this manner the scissors according to the invention can be positioned quickly and safely in a case or in a counter display unit provided with suitable scissor supporting pins.

Furthermore the scissors according to the invention have the first lever rotatable around the bush and the second lever integral with the rivet, by means of the riveting of the rivet and of the consequent deformation of the washer. As a result, the slack between the two blades is reduced to a minimum and is equal only to the slack between the first lever and the rivet. This ensures a high cutting efficiency and precision.

Further characteristics of the invention will be made clearer by the detailed description that follows, referring to a purely exemplifying and therefore non limiting embodiment thereof, illustrated in the appended drawings, in which.

Figure 1:
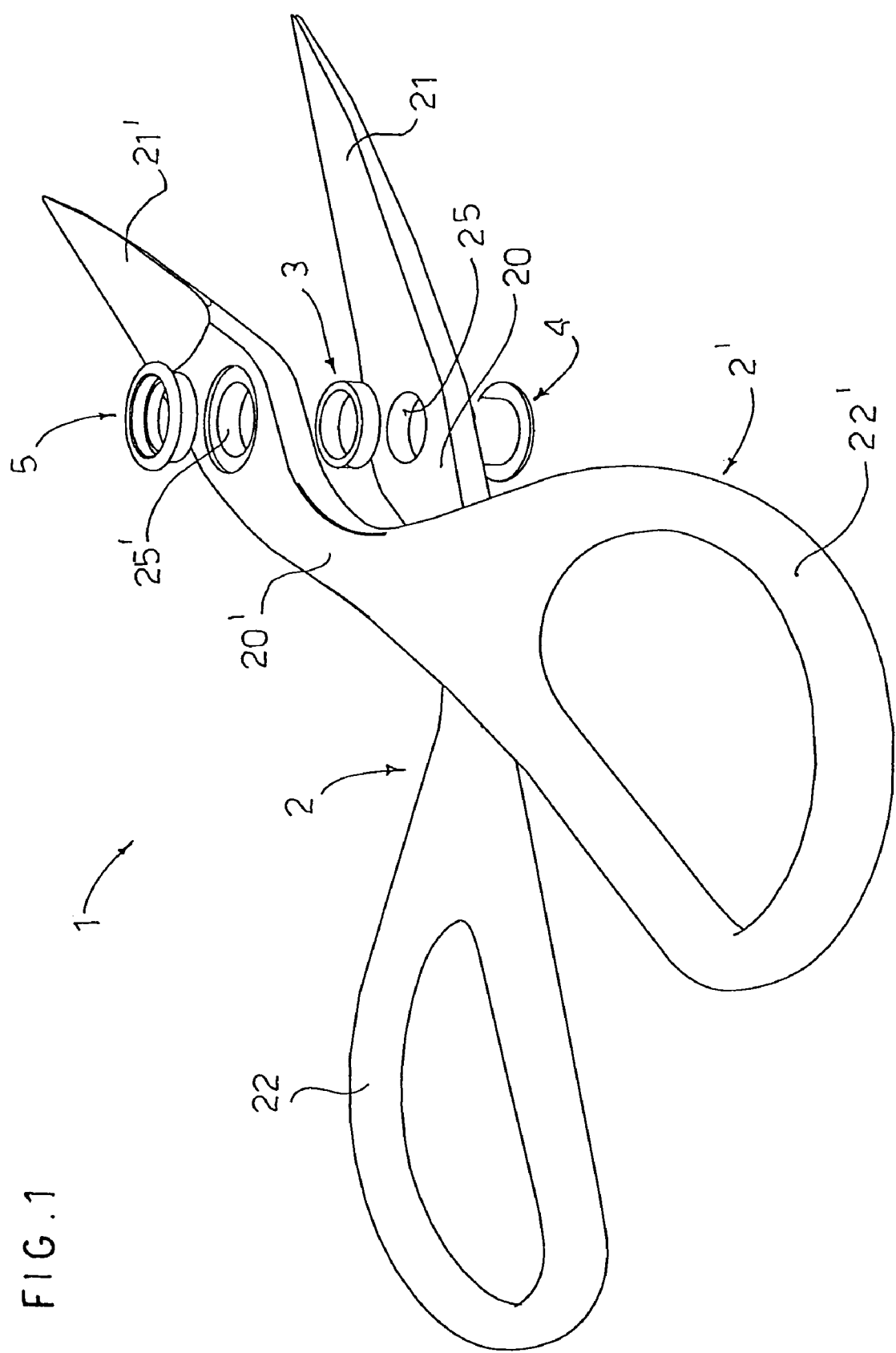
FIG. 1 is a top perspective view illustrating a pair of scissors according to the invention exploded.
Figure 2:
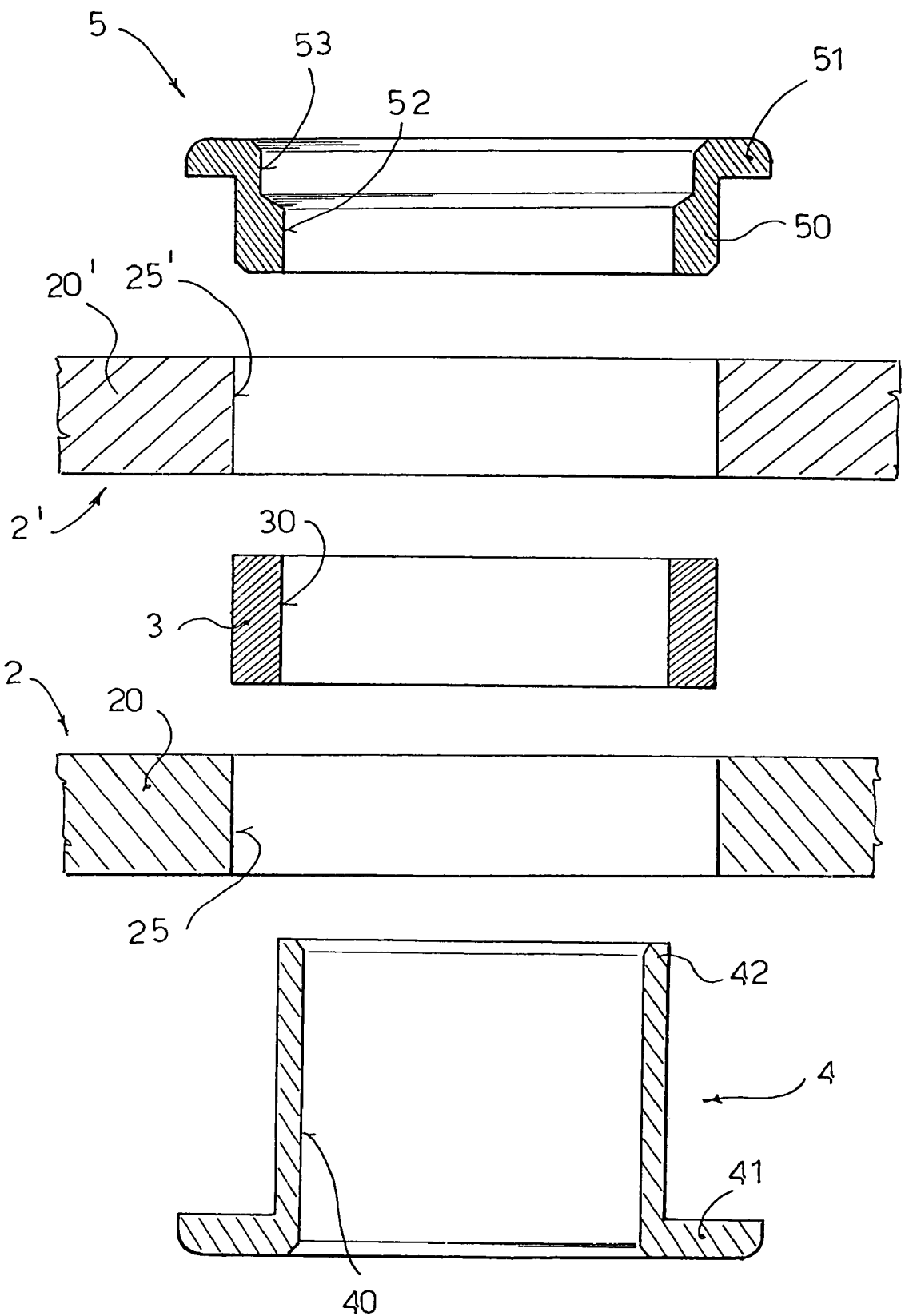
FIG. 2 is an enlarged axial sectional view, illustrating the elements of FIG. 1 exploded, in which the levers of the scissors are partially broken off.

The scissors according to the invention, denoted as a whole with reference numeral 1, are described with the aid of the figures.

The scissors 1 comprise a first lever 2 and a second lever 2', substantially identical. For ease of description, considering the scissors 1 of FIG. 1 resting on the plane of the sheet, the first lever 2 and the second lever 2' will henceforth be called bottom lever 2 and top lever 2'.

Each lever (2, 2') comprises a central portion (20, 20'), a cutting portion (21, 21') and a gripping portion (22, 22'). The central portion (20, 20') has a greater thickness than the cutting portion (21, 21'). The cutting portion (21, 21') is shaped as a cutting blade and the gripping portion (22, 22') is shaped so as to be gripped easily by the user. For example, an open or closed ring designed to allow a user's finger to be inserted can be provided at the end of the gripping portion (22, 22').

Two through holes (25, 25') having the same diameter are provided in the central portions (20, 20') of each lever (2, 2'). The central part 20' of the top lever 2' is disposed on the central part 20 of the bottom lever 2 so that the two holes (25, 25') are disposed coaxially in register.

A bush 3 is disposed inside the hole 25 of the bottom lever 2, in a rotating coupling relationship, so that the bottom lever 2 can rotate with respect to the bush 3.

The bush 3 is shaped as an internally hollow cylinder having an axial through hole 30. The thickness of the bush 3 is extremely small and can vary in the range of 0.5 mm to 4 mm, preferably about 1 mm.

The outside diameter of the bush 3 is equal to or slightly smaller than the diameter of the hole 25 in the central part of the bottom lever 2, so as to ensure an adequate surface contact of the outer surface of the bush 3 with the inner surface of the central part 20 of the bottom lever around the hole 25 during rotation of the bottom lever 2. For this purpose both the outer surface of the bush 3 and the inner surface of the central part 20 of the lever 2 which defines the hole 25 must be suitably smooth and must have a low coefficient of friction related to the reciprocal sliding.

Since the levers (2, 2') of the scissors are generally made of steel for scissors, in order to have a low coefficient of friction the bush 3 can made of composite materials or of polymers such as PTFE (poly-tetra-fluoro-ethylene) known by the commercial names of Teflon, Algoflon or Fluon.

The outside diameter of the bush 3 must be large enough to ensure the largest possible contact surface in the rotating coupling between the lever 2 and the bush 3. For this purpose, the bush 3 can preferably have an outside diameter greater than 2 mm, preferably 6 mm.

The height of the bush 3 is slightly greater than the axial extension of the hole 25 of the lever 2.

A rivet 4 shaped as an internally hollow cylinder having an axial through hole 40, is inserted into the hole 30 of the bush 3. The rivet 4 has an outside diameter equal to or slightly smaller than the inside diameter of the bush 3.

The height of the rivet 4 is greater than the height of the bush 3 and greater than the sum of the thicknesses of the central parts (20, 20') of the two levers (2, 2'). The rivet 4 has an edge, for example the bottom edge 41, folded outwards so as to form a collar with a larger diameter that protrudes radially therefrom.

In this manner, when the rivet 4 is disposed in the bush 3, the collar 41 of the rivet abuts against the bush 3 and against the surface of the central part 20 of the top lever 2, and the top edge 42 of the rivet protrudes upward from the bush 3 and from the central part 20' of the top lever 2'.

The rivet 4 is preferably made of deformable metal material, such as AISI 303 stainless steel or ordinary steel.

A washer 5 having a cylindrical body 50 with a smaller outside diameter than the diameter of the hole 25' of the top lever 2' and an upper collar 51 with a larger diameter protruding radially outward to abut on the top surface of the central part 20' of the top lever 2' is also provided. The washer 5 is hollow on the inside and has a hole with a smaller diameter 52 coinciding with the body 50 and a hole with a larger diameter 53 coinciding with the collar 51. The hole with smaller diameter 52 of the washer 5 has a greater diameter than the outside diameter of the rivet 4 so that the washer 5 can be passed through by the rivet 4. The washer 5 is made of deformable metal material, such as ERGAL 7075 anodized aluminium alloy.

Figure 3:
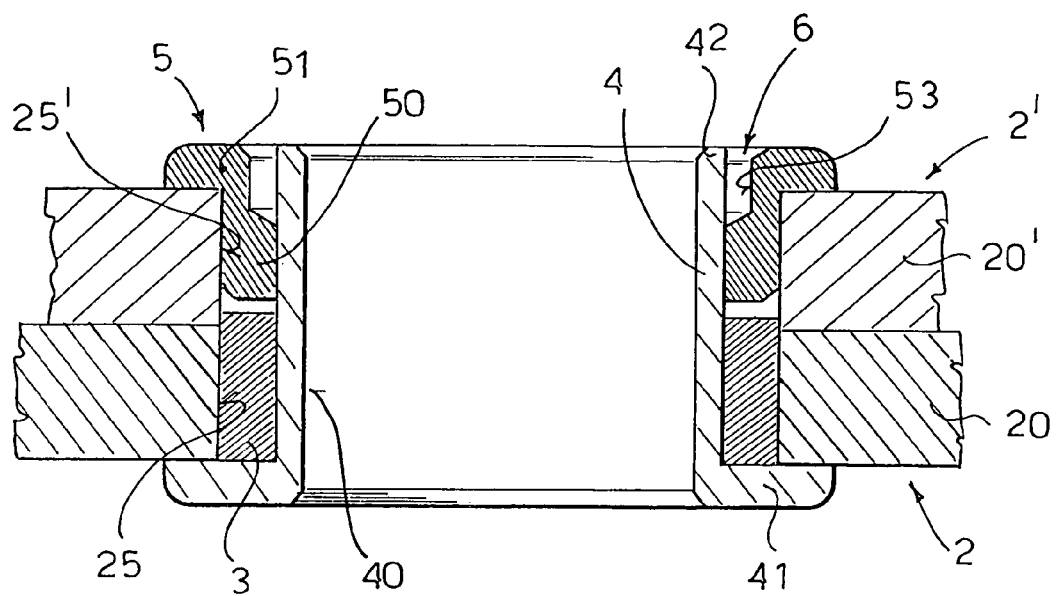
FIG. 3 is an axial sectional view of the elements of FIG. 2 assembled before riveting.

Assembly of the scissors 1 is described with reference to FIG. 3. The bush 3 is fitted on the rivet 4 so that it abuts on the collar 41 of the rivet 4. The rivet 4 with the bush 3 is inserted into the hole 25 in the bottom lever 2, so that the collar 41 of the rivet abuts against the central part 20 of the bottom lever 2 and the bush 3 is situated between the rivet 4 and the bottom lever 2.

Then the top lever 2' is disposed on the bottom lever 2, inserting the rivet 4 inside the hole 25' of the top lever, so as to leave an annular space to receive the body 50 of the washer 5. Finally the body 50 of the washer 5 is inserted into the hole 25' of the top lever 2', until the collar 51 of the washer abuts against the central part 20' of the top lever. The body 50 of the washer 5 is situated between the top lever 2' and the rivet 4.

It should be noted that the bottom end of the body 50 of the washer does not touch the top end of the bush 3. Furthermore an annular space 6 is left between the top part 42 of the rivet and the surface which defines the hole 53 of the collar 51 of the washer.

At this point the scissors 1 are disposed in a riveting machine for riveting of the top edge 42 of the rivet 4. The riveting machine has a special tool, which is inserted, into the hole 40 of the rivet. This tool, with an eccentric rotation, expands the material of the rivet 4 from the inside outwards.

Figure 4:
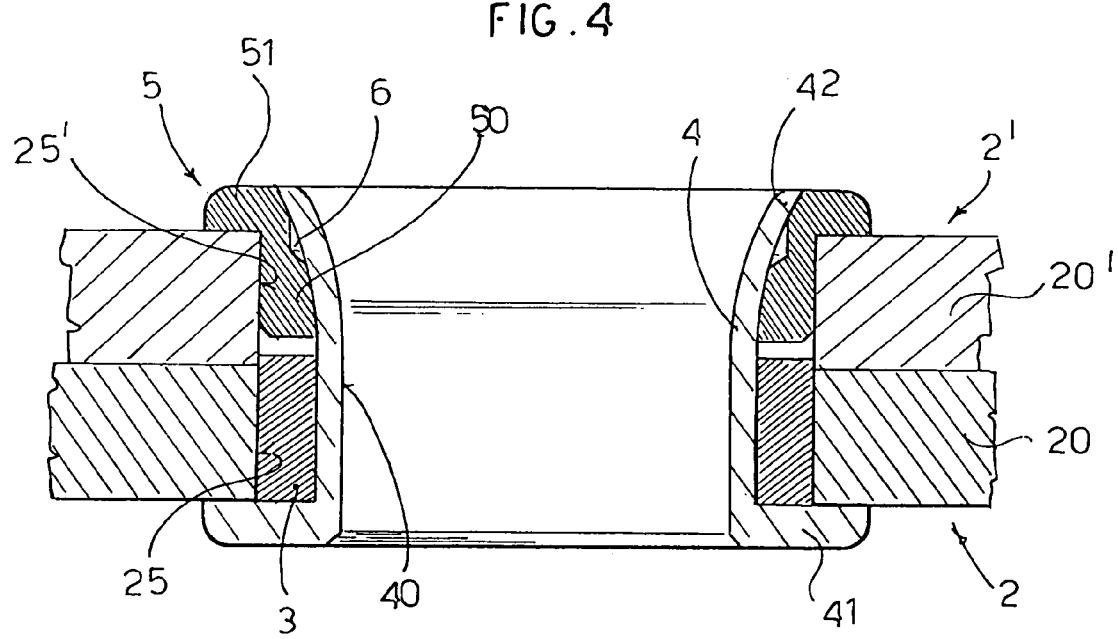
FIG. 4 is a view like FIG. 3, illustrating the elements of the scissors assembled after riveting.

As a result, as shown in FIG. 4, the top edge 42 of the rivet 4 is bent outwards into the space 6, abutting against the surface of the washer 5 which defines the hole 53 in the collar 51. In this manner the washer 5 is deformed outwards, compressing the central part 20' of the top lever 2'. Thus the top lever 2' is blocked and made integral with the rivet 4. To facilitate riveting, the top edge 42 of the rivet may have cuts.

Expansion of the rivet 4 during riveting makes the rivet 4 also integral with the bush 3 which is not deformed, being made of polymer. As a result, the bottom lever 2 can rotate around the bush 3. Thus the bottom lever 2 can rotate reciprocally with respect to the top lever 2' which is integral with the assembly formed by the washer 5, by the rivet 4 and by the bush 3.

The riveting pressure is set in the riveting machine so as to have a constant closing precision of the blades (21, 21') during rotation of the two levers (2, 2').

It must be considered that riveting is performed only on the top edge 42 of the rivet, whilst the bottom collar 41 of the rivet maintains a constant thickness, which is pre-set and which can be comprised, for example, between 0.5 and 1 mm. As a result, the slack between the collar 41 of the rivet and the central part 20 of the bottom lever is reduced to a minimum and can be contained between 0.05 and 0.2 mm. This ensures an extreme cutting precision of the scissors 1. In fact during operation of the scissors 1, the two blades (21, 21') meet with a minimum slack. Traditional scissors with a rivet, on the other hand, have a slack at least double than that of the scissors according to the invention, since the slack of both levers with respect to the rivet must be considered.

Numerous variations and modifications of detail within the reach of a person skilled in the art can be made to the present embodiment of the invention without thereby departing from the scope of the invention as set forth in the appended claims.

The invention claimed is:

1. A scissors (1) comprising a first lever (2) and a second lever (2') provided with respective coaxial holes (25, 25') in their central portions (20, 20') and a rivet (4) placed in said holes (25, 25') of the levers (2, 2'), characterized in that it comprises:
   a bush (3) interposed between the rivet (4) and the surface of the hole (25) of the first lever (2) so that the first lever (2) can rotate with respect to the bush (3) which remains integral with the rivet (4), and
   a washer (5) interposed between the rivet (4) and the surface of the hole (25') of the second lever (2'), so that the outward deformation of one portion (42) of the rivet (4) compresses the washer (5) on the central portion (20') of the second lever, making the second lever (2') integral with the rivet (4).

2. The scissors (1) of claim 1, wherein said bush (3) is shaped as a cylinder, hollow on the inside and having an outside diameter substantially equal to or slightly smaller than the diameter of said holes (25, 25') in the central portions (20, 20') of the levers and a height substantially equal to or slightly greater than the thickness of the central portion (20) of the first lever.

3. The scissors (1) of claim 1, wherein the outer surface of said bush (3) is smooth and is made of a material having a low coefficient of friction with respect to the material of the surface of the hole (25) of the central portion (20) of the first lever (2).

4. The scissors (1) of claim 1, wherein said bush (3) is made of composite materials.

5. The scissors (1) of claim 1, wherein said bush (3) has an outside diameter greater than 2 mm.

6. The scissors (1) of claim 1, wherein said bush (3) has a thickness between 0.5 and 4 mm.

7. The scissors (1) of claim 1, wherein said rivet (4) is an internally hollow cylinder comprising a collar with a greater diameter (41) destined to abut against said bush (3) and against the surface of the central portion (20) of the first lever around the hole (25) of the first lever and an end edge (42) destined to be folded outwards so as deform the washer (5) against the second lever (2') to make the second lever (2) integral with the rivet (3).

8. The scissors (1) of claim 7, wherein the end edge (42) opposed to the collar (41) of the rivet (4) has cuts.

9. The scissors (1) of claim 7, wherein said washer (5) comprises a cylindrical body (50) with a collar of greater diameter (51) destined to abut against the central part (20') of the second lever (2') around the hole (25') of the second lever.

10. The scissors (1) of claim 9, wherein said washer comprises a first hole (52) coinciding with the body (50) and a second hole of greater diameter (53) coinciding with the collar (51) to allow outward deformation of said end edge (42) of the rivet.

11. The scissors of claim 10, wherein said washer (5) is made of deformable metal material.

12. The scissors of claim 10, wherein said washer (5) is made of anodized aluminium alloy.

13. The scissors (1) of claim 1, wherein said rivet (4) is made of deformable metal material.

14. The scissors (1) of claim 1, wherein said bush (3) is made of polymers.

15. The scissors (1) of claim 1, wherein said bush (3) is made of PTFE (poly-tetra-fluoro-ethylene).

16. The scissors (1) of claim 1, wherein said rivet (4) is made of steel.

17. The scissors (1) of claim 1, wherein said rivet (4) is made of stainless steel.

* * * * *